Oct. 1, 1935. T. LINDENBERG 2,016,207
ANTIVIBRATION APPARATUS FOR MOTOR VEHICLES
Filed May 31, 1932

Inventor
Theodore Lindenberg,
By W. A. M. Lowell
Attorney

Patented Oct. 1, 1935

2,016,207

UNITED STATES PATENT OFFICE 2,016,207

ANTIVIBRATION APPARATUS FOR MOTOR VEHICLES

Theodore Lindenberg, Columbus, Ohio

Application May 31, 1932, Serial No. 614,510

7 Claims. (Cl. 296—1)

This invention relates to an improved stabilizing means for reducing road shock and vibration on the part of spring supported motor vehicle bodies or frames, the invention being especially useful in the matter of breaking up through the application of neutralizing forces of rhythmic, cumulative wave motions of a vehicle body when the vehicle is being driven with considerable speed over uneven or undulatory road surfaces.

In providing for improved riding comfort, practically all modern automobiles are equipped, in addition to the body supporting springs, with shock absorbing devices usually arranged between the axles and frame. These devices function quite effectively in the matter of retarding the movement of the body and the normal action of the springs in response to road surface variations, and especially in checking major body motion when encountering abrupt unevenness in road level. However, such shock absorbing devices do not prevent that rhythmic vertical vibratory wave motion of a vehicle body of a more or less harmonic character which motor vehicle users frequently experience in traveling at touring speeds over various types of road surfaces. Apparently the relatively movable parts of the motor vehicle chassis become synchronized in their action with the result that there is a decided unpleasant uniform wave like motion which is a source of discomfort and often illness to motor vehicle occupants.

It is therefore a primary object of the present invention to provide means of a simple yet efficient character for neutralizing or interrupting this rhythmic motion, to reduce the "peaks" of such wave-like motion and improve thereby the riding qualities of standard motor vehicles.

In carrying out my invention, I preferably employ an inertia member in the form of a weight which is adapted to be carried by the spring supported frame of a motor vehicle and to be confined for vertical travel in a suitable guide or casing structure, the said member being confined between opposing resilient devices in such manner that it will exert a delayed inertia effect upon the vibratory or wave-like movement of the vehicle frame, producing forces which resist upward movement of the frame from a normal position and corresponding forces upon downward movement of the frame toward the normal position.

For a further understanding of the invention, reference is to be had to the following description and the accompanying drawing, wherein.

Figure 1:
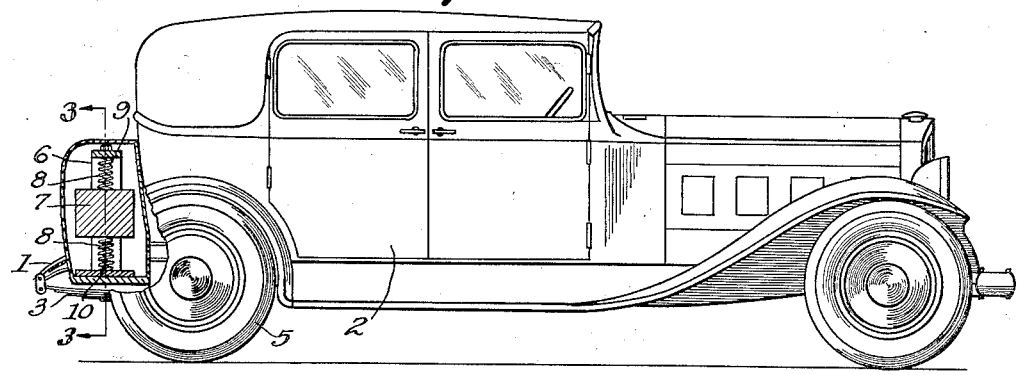
Fig. 1 is a side elevation of a motor vehicle, partly in vertical section, disclosing an illustrative embodiment of the stabilizing means comprising the present invention to the vehicle.
Figure 2:
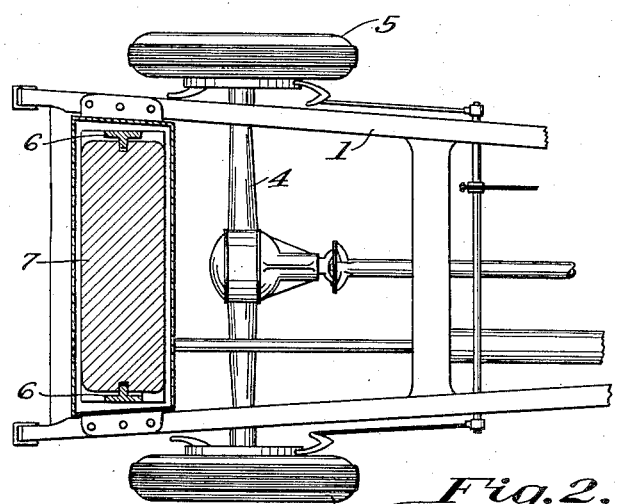
Fig. 2 is a plan view partly in horizontal section of the rear end of the chassis of the vehicle.
Figure 3:
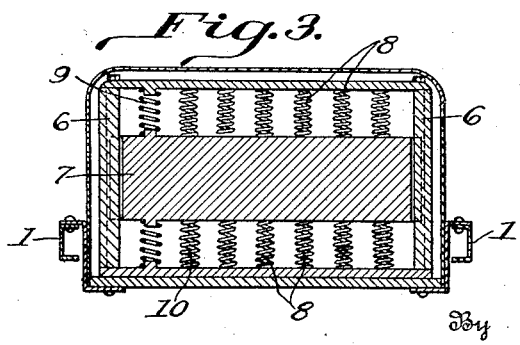
Fig. 3 is a vertical transverse sectional view on the line 3—3 of Fig. 1.

Referring more particularly to the drawing, a motor vehicle has been illustrated conventionally comprising the usual chassis frame 1 for the support of the vehicle body 2. The frame 1 is connected with the usual supporting springs 3 which have their intermediate portions connected with the rear axle 4 and the driving wheels 5.

Mounted upon the frame 1 contiguous to the rear portion of the body 2, is a casing or guide structure 6 in which is mounted for vertical movement an inertia member 7, preferably in the form of a weight of some magnitude. This inertia member is free to vibrate vertically in the casing or guide structure 6 independently of the frame 1 or the body 2 and is confined between the plurality of resilient resistance devices 8, which in the form disclosed consists of sets of upper and lower coil springs 9 and 10 respectively, the springs 9 being confined between the upper end of the casing structure 6 and the corresponding portions of the member 7, whereas the springs 10 are disposed between the lower portion of the casing or guide structure and the corresponding portion of the member 7.

By the employment of this construction, it will be seen that while the frame 1 and the body 2 move vertically in response to their road imparted vibratory motion, the inertia member functions to produce a resisting force to counteract the peaks of such motion and levelize the same. This result is secured not merely by virtue of the inherent weight of the inertia member but by reason of its peculiar mounting. When the frame and body move upwardly, the first action is to compress to a greater degree the lower set of springs 10 before corresponding vertical movement is imparted to said inertia member, thus enabling the latter to exercise a snubbing or checking effect on such upward movement of the frame and body. After this action has been exerted, the inertia member will then travel in unison with the frame and body during the balance of their upward movement. However, when the vehicle springs 3 again react to draw the frame and body downwardly, it will be noted that the inertia member then imparts a second checking or snubbing action, since the member 7 is moving upwardly in unison with the body, the change of direction of the movement of said body to, for instance, a downward direction is not immediately imparted to the member 7, since the latter before moving downwardly in unison with the body must compress the upper springs 9 to overcome the inertia of the member 7 and it is this delayed inertia effect of the member 7, producing resistant forces to the changes in motion of the vehicle body and frame that interrupts or neutralizes such wave-like motions, whereby to reduce the peaks of said motions and to compel the body and frame to be confined for but limited travel in a vertical undulatory manner.

The principles of my invention may be embodied in many structural forms differing widely from the single embodiment herein disclosed, and I therefore reserve the right to employ all such modifications or variations that may be said to fall within the scope of the following claims.

What is claimed is:

1. A stabilizer for neutralizing rhythmic vibration on the part of a spring supported motor vehicle frame comprising a guide structure extending between the spaced side channels of said frame structure and contiguous to one end thereof, an elongated weight member arranged transversely of said frame and mounted within said guide structure for movement relative to the frame, and resilient resistant devices opposing the movement of said weight member vertically in either direction from its normal position, whereby to cause said weight member to impart through its delayed inertia response checking forces to the vertical vibratory movement of the vehicle frame.

2. The combination with the spring supported chassis of a motor vehicle, of a guide structure mounted on said chassis contiguous to one end thereof, a weight confined for vertical travel in said guide structure and movable relative to said chassis, said weight having the central portion thereof arranged in the longitudinal axis of said chassis and with equal portions thereof on each side of said axis, and resilient means opposing movement of said weight members in either direction within said guide structure, whereby said weight member through inertia imparts forces to said frame opposing changes in the direction of vibratory motion thereof.

3. The combination with the spring supported chassis of a motor vehicle, of a guide structure extending between the side channels of said chassis, a weight member of greater length than height arranged transversely of said chassis and confined for vertical travel in said guide structure, and a plurality of springs positioned above and below said weight member for opposing the movement thereof in either direction from its normal position within said guide structure.

4. A stabilizer for motor vehicles comprising a guide structure formed to include a top member, a bottom member and parallel vertically extending side members, said guide structure extending between the side channels of a motor vehicle frame and attached thereto, an elongated weight member positioned for vertical sliding movement between said side members, and resilient means tending to resist the vertical movement of said weight member.

5. A stabilizer for motor vehicles comprising a guide structure formed to include a top member, a bottom member and parallel vertically extending side members, said guide structure extending between the side channels of a motor vehicle frame and attached thereto, an elongated transversely extending weight member positioned for vertical sliding movement between said side members and resilient means positioned between said weight and the top and bottom of said guide structure to resist the vertical movement of the weight.

6. A stabilizer for motor vehicles comprising a guide structure formed to include a top member, a bottom member and parallel vertically extending side members, said guide structure extending between the side channels of a motor vehicle frame and attached thereto, an elongated transversely extending weight member positioned for vertical sliding movement between said side members, and a plurality of coil springs provided between said weight and the top and bottom of said guide structure to resist vertical movement of said weight.

7. A stabilizer for motor vehicles comprising a guide structure formed to include a top member, a bottom member and parallel vertically extending side members, said guide structure extending between the side channels of a motor vehicle frame and attached thereto, an elongated transversely extending weight member positioned for vertical sliding movement between said side members, a plurality of coil springs provided between said weight and the top and bottom of said guide structure to resist vertical movement of said weight, and a housing structure arranged to enclose said stabilizer and attached to said vehicle frame.

THEODORE LINDENBERG.